United States Patent [19]

Cramer et al.

[11] 4,219,384

[45] Aug. 26, 1980

[54] DRIVING APPARATUS FOR AN ABSORBER ROD

[75] Inventors: Heinz Cramer, Stade; Hubert Handel, Rimbach; Manfred Schefold, Maisach; Hermann Schmitt, Bad Durkheim; Josef Schoening, Hambruecken, all of Fed. Rep. of Germany

[73] Assignee: Hochtemperatur-Reaktorbau GmbH, Cologne, Fed. Rep. of Germany

[21] Appl. No.: 848,603

[22] Filed: Nov. 4, 1977

[30] Foreign Application Priority Data

Nov. 6, 1976 [DE] Fed. Rep. of Germany ....... 2650923

[51] Int. Cl.² .............................................. G21C 7/14
[52] U.S. Cl. .............................. 176/36 C; 176/36 W
[58] Field of Search ................. 176/36 R, 36 W, 36 C

[56] References Cited

U.S. PATENT DOCUMENTS

| 3,197,378 | 7/1965 | Fortescue | 176/36 C |
| 3,733,251 | 5/1973 | Gilbertson et al. | 176/36 C |
| 3,785,923 | 7/1974 | Bratoljic et al. | 176/36 W |

FOREIGN PATENT DOCUMENTS

| 618121 | 4/1961 | Canada | 176/36 R |
| 921660 | 3/1963 | United Kingdom | 176/36 R |
| 1035747 | 7/1966 | United Kingdom | 176/36 W |
| 1090632 | 11/1967 | United Kingdom | 176/36 W |
| 1221690 | 2/1971 | United Kingdom | 176/36 W |
| 1431861 | 4/1976 | United Kingdom | 176/36 R |

*Primary Examiner*—Samuel W. Engle
*Assistant Examiner*—S. A. Cangialosi
*Attorney, Agent, or Firm*—Schwartz, Jeffery, Schwaab, Mack, Blumenthal & Koch

[57] ABSTRACT

A driving apparatus for raising and lowering an absorber rod within a nuclear reactor pressure vessel. The apparatus comprises a driving system which includes a motor-driven flexible support member that is connected to the absorber rod through both a coupling element and a connecting element, and a storage means for storing any excess length of flexible support member. Both the driving system and the storage means are detachably enclosed within a desired gaseous environment that is isolated from the interior of the pressure vessel by a screening plug having a passageway therein through which the connecting element is disposed for movement between an upper end position and a lower end position.

13 Claims, 5 Drawing Figures

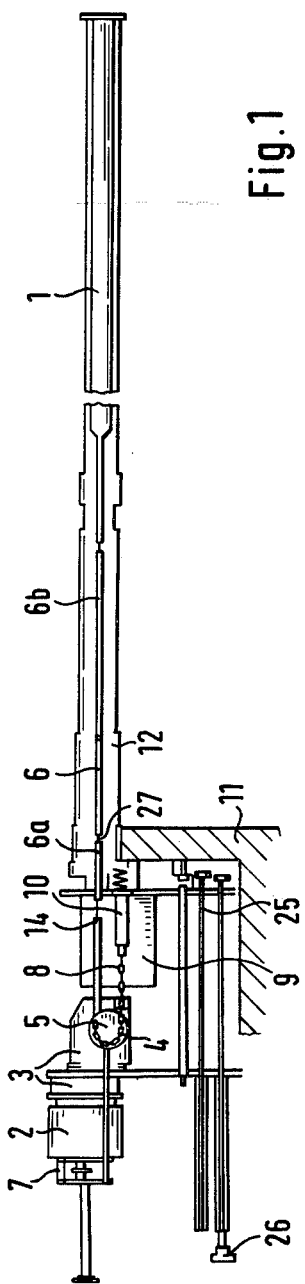
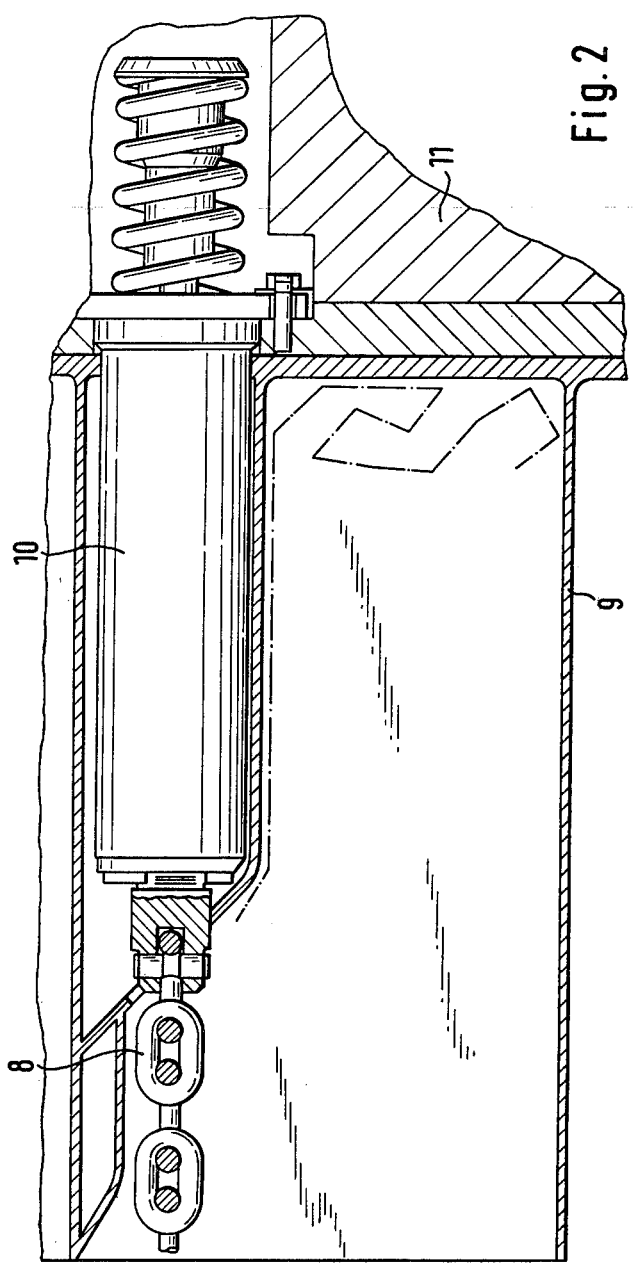

DRIVING APPARATUS FOR AN ABSORBER ROD

BACKGROUND OF THE INVENTION

1. Field of the Invention

The invention relates to driving apparatus utilizing flexible support means for supporting the absorber rods of nuclear reactors.

2. Description of the Prior Art

The use of flexible support members, such as cables or chains, for the lifting and lowering of absorber rods within bores in nuclear reactor cores are known in the prior art. For example, the Auslegeschrift No. 11 46 988 discloses a mechanical device including a cable winch, wherein the absorber rod is supported at the lower end of the cable, while the upper end of the cable is rigidly mounted at the winch-housing and maintained stationary. The cable is led in series several times across two roller sets, the distance between which is variable. This device does not require a bulky cable drum, the latter being undesirable in nuclear reactors because of its comparatively large overall dimension.

A cable drum for the storing of a flexible support member having a control rod supported at its free end is described in the Auslegeschrift No. 10 92 572. The drum, driven by an electric motor, is installed in a chamber that is disposed outside of the reactor pressure vessel and provided with a biological screening.

It is known from the Auslegeschrift No. 12 23 469 to guide the flexible support member around an 180° turn on a guide roller, at one end of which member the control rod is hung and at the other end of which member is mounted means for storing portions of the flexible support member not needed at the moment. Below the guide roller are provided two interlocking systems for controlling the flexible member hanging down from the roller. During the simultaneous opening of both interlocking systems, the flexible support member runs across the roller and the control rod is permitted to freely fall down into the reactor core.

A further device for the insertion of absorber elements into the core of the reactor is described in the Offenlegungsschrift No. 23 32 930. This device consists of a chain for supporting the absorber rod, a chain wheel driven by a motor, and a coupling element between the absorber rod and the chain. The coupling element may be an electromagnet or a mechanical gripping device. The unused portion of the chain is stored in a chain box.

Furthermore, the Offenlegungsschrift No. 15 89 666 discloses a control device for a control rod of a nuclear reactor whose mechanism is arranged in the axis of the control rod and designed in such a way that the transport of the fuel elements is not hindered. This is achieved by means of a rotating arm. The mechanism is connected with its upper part to a driving organ and with its lower part across a detachable system for locking of the control rod. During normal operation, both parts are coupled to each other by an electromagnet.

SUMMARY OF THE INVENTION

The present invention is based on an improvement of the prior art and comprises a driving apparatus for an absorber rod wherein the driving apparatus is accessible during the operation of the reactor and can also be detached for repairs while the absorber rod is disposed in an extended position within the reactor core.

According to the invention, the driving apparatus comprises a driving system and a storing device which are detachably disposed within a system enclosure such as a steel tube, mounted on top of the pressure vessel and filled with a desired gaseous atmosphere, such as helium. The steel tube is closed and isolated from the internal portion of the pressure vessel by a screening plug provided with a passageway therein for receiving a flexible support member and an associated connecting element therethrough. There is also provided a coupling device for the coupling of the support member to the connecting element, which coupling device is operated from the outside of the pressure vessel. There is further provided a locking device for the connecting element, also to be operated from the outside. The connecting element is designed to function as a movable plug in the screening plug passageway and is movable between an upper end position, when it is disposed within the screening plug, and a lower end position, when the absorber rod is within the reactor core.

The driving apparatus according to the invention not only ensures a safe inserting and removal of the absorber rod, but also provides the shielding of the driving apparatus environment from the reactor atmosphere. In this way, the driving apparatus can be maintained or dismounted without a reduction of the reactor pressure. The absorber rod, which can be detached from the driving apparatus from the outside of the pressure vessel, is maintained in an extended position in the reactor during the changing process. Accordingly, only the nonactivated parts need be disassembled or assembled, thus providing an easy handling during the changing of these parts with no special protective screen vessel and no heavy lifting appliances being necessary. Another advantage is that the total driving apparatus includes only a few mechanical parts cooperating with each other, thereby minimizing wear of the apparatus. This is important since the driving system and the storing device are contained with the helium atmosphere. A further advantage of the invention is that the nuclear reactor can be operated more economically since it does not have to be shut down if the driving apparatus or any part of it has to be maintained or changed.

Advantageously, the flexible support member comprises a chain having round links which is driven by a chain wheel that is rigidly connected to the driving motor across a reversible reduction gear and around which wheel the chain is guided through an 180° path. Both the chain and the chain wheel are of a relatively small diameter and small in bulk. Commercially available elements can be used for this purpose, but they should preferably be submitted to a suitable surface treatment to extend their working life. The chain wheel is disposed in the steel tube at a distance of approximately 0.25 meter below the upper edge of the pressure vessel top. The chain and chain wheel collectively form a portion of the driving system for supporting the absorber rod. The connecting element, designed to function as a movable plug, facilitates the insertion and withdrawing of the absorber rod. If no movement of the rod is required, the latter is magnetically locked by an active motor and held in the desired position.

The emergency shut down signal of the usual reactor safety circuit (scram) directly affects its own switches, which serve to separate the absorber rod from all power sources and permit it to fall into its lower end position under the force of gravity. Under this condition, mechanical uncoupling does not occur since the motor maintains its connection to the absorber rod through the chain, the chain wheel and the gear. It is advantageous to dispose a shock absorber in the storing device for connection to the end of the chain to absorb most of the falling energy of the absorber rod when it reaches its lower end position after a rapid fall. Such a shock absorber can comprise a helical spring or its functional equivalent.

A two-phase alternating current motor is preferred for the driving motor. The motor is rigidly coupled to the chain wheel across the reduction gear. The rotational speed of the motor can be continuously adjusted by the control voltage from standstill up to the maximum value. This maximum value is fixed so that the absorber rod may move at a maximum speed of about 7 meters/second at the intended reduction of speed between the motor and the absorber rod. The reversible reduction gear is arranged in an oil-bath which is maintained at the same pressure as the helium in the steel tube. At the exit of the reduction gear, there is advantageously provided an eddy-current brake with a permanent magnet for limiting the motor speed during emergency shut down operations. This type of brake is especially suitable for use in nuclear reactor applications.

The coupling of the absorber rod to the flexible support member is effected, according to the invention, by a coupling device which can be operated from outside of the pressure vessel. It may be a conventional system which is disposed between the round-link chain and the connecting element and designed to also function as a movable plug. Such a coupling device can, for example, include a hook carried by the end of the flexible support member or chain that is swingable about a horizontal axis and having a locking counterpart carried by the connecting element. The swinging movement of the hook is achieved by a pole that is rotatable around a horizontal axis and disposed within the steel tube. The pole is actuated by means mounted on the driving apparatus and operated from a location outside of the pressure vessel.

The screening plug closing the steel tube at its bottom is detachably connected to the steel tube by a locking ball assembly. A rim of eight balls is pushed outwards by a movable bushing in a groove provided in the steel tube. Means are provided to prevent the groove from suddenly moving upwardly. Between the screening plug and the steel tube is provided a sealing means with a leakage indicator.

The connecting element, functioning as a movable plug, is of a cylindrical configuration and is disposed within a passageway provided in the screening plug during changing of the parts making up the driving apparatus. The passageway has a corresponding cylindrical configuration. The sealing means between the screening plug and the upper end of the element is effected by means of a seal, such as a KLF-seal, which is connected to the same leakage indicator as the seal between the screening plug and the steel tube. The KLF-seal is protected against chain-abrasion by a socket. It is advantageous to design the connecting element making up the movable plug in two parts and to movably connect them to each other, thereby facilitating the insertion of the element into the screening plug, with the actual coupling point being disposed at the upper end of the element.

As previously described, there is provided a locking device for the connecting element in the driving apparatus. This can be of a locking ball assembly and an operating mechanism for achieving the locking action. The locking mechanism can be set into operation from the outside and serves to lock the connecting element so that the round-link chain can be uncoupled and the driving apparatus or a part of it can be lifted.

BRIEF DESCRIPTION OF THE DRAWINGS

The drawings schematically depict an example of the driving apparatus according to the invention as follows:

FIG. 1 is an overall schematic representation of the driving apparatus of the invention;

FIG. 2 is a fragmentary sectional view of the flexible support member and the storing device of the apparatus of FIG. 1;

DETAILED DESCRIPTION OF THE PREFERRED EMBODIMENT

Figure 3:
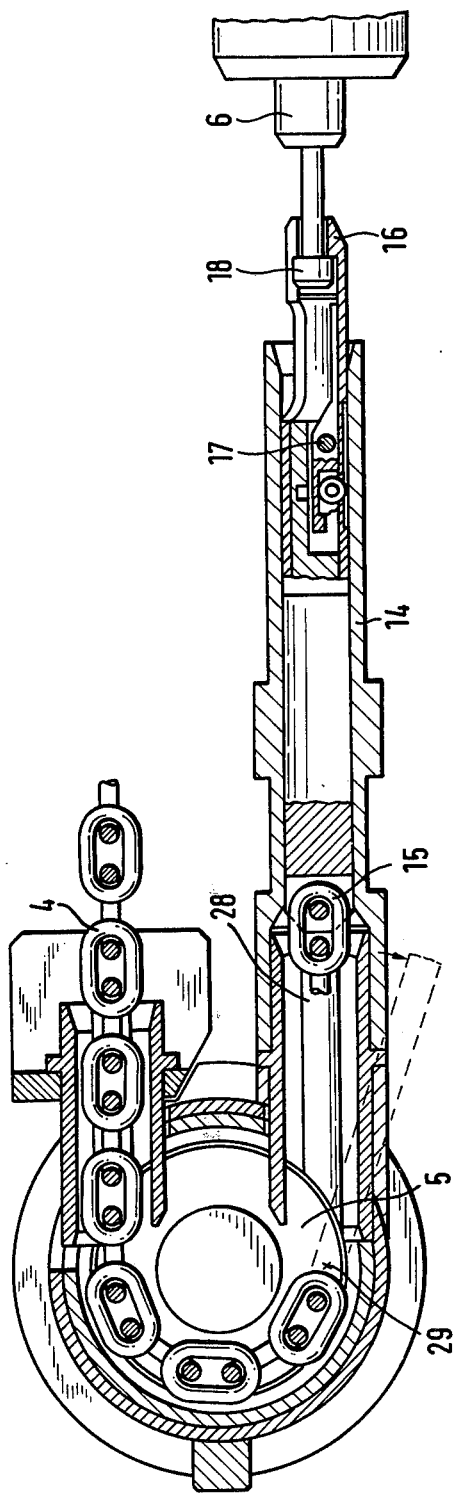
FIG. 3 is a fragmentary longitudinal sectional view through the coupling device of the apparatus of FIG. 1.

In FIG. 1, there is shown a driving apparatus of the invention for an absorber rod 1, which apparatus is provided for the control or shutdown operations of a nuclear reactor (not shown). The driving apparatus essentially comprises a driving system that includes a driving motor 2, a reversible reduction gear 3 and a round-link chain 4, the latter being driven by a chain wheel 5 and guided therearound through an 180° path. Round-link chain 4 and chain wheel 5 define a support for absorber rod 1, the former being detachably coupled to an interposed connecting element 6, as shall further be hereinafter described.

Chain wheel 5 is rigidly connected to driving motor 2 across reduction gear 3. Driving motor 2 may be a two-phase alternating current motor that is equipped with an eddy-current brake 7 for limiting the speed of motor 2 during emergency operations.

An end 8 of round-link chain 4 not connected to absorber rod 1 is disposed within a storing device 9, which device 9 stores excess or unused portions of chain links. Furthermore, chain end 8 is connected to a shock absorber 10, as shown in FIG. 2.

Driving motor 2, gear 3, round-link chain 4 and chain wheel 5, as well as storing device 9, are removably disposed within an enclosure 11, such as a steel tube, which extends through the top of the reactor pressure vessel (not shown) and is provided with a desired gaseous atmosphere, such as helium. The lower end of the steel tube 11 is sealed from the internal portion of the reactor pressure vessel by a screening plug 12, which has a passageway 13 for accommodating round-link chain 4 and its associated connecting element 6. This is clearly shown in FIGS. 4 and 5. Connecting element 6 functions as a sealing plug and is in the form of a long cylinder having a cross-sectional configuration corresponding substantially to the cross-sectional configuration of passageway 13 and is movable between both an upper end position and a lower end position. Element 6 assumes its upper end position when it is disposed within screening plug 12.

The coupling of the round-link chain 4 to element 6, the latter serving as a connecting element between one end of round-link chain 4 and absorber rod 1, is effected by means of a coupling device 14, which is shown in FIG. 3. Coupling device 14 includes a hook 16 carried at the other end 15 of chain 4. Hook 16 is swingable around a horizontal axle 17 and interlocks with a counterpart 18 carried at the end of element 6. The swinging movement of hook 16 is effected by means of a pole disposed in steel tube 11, which pole can be turned around a horizontal axis from the outside of the reactor pressure vessel.

Figure 4:
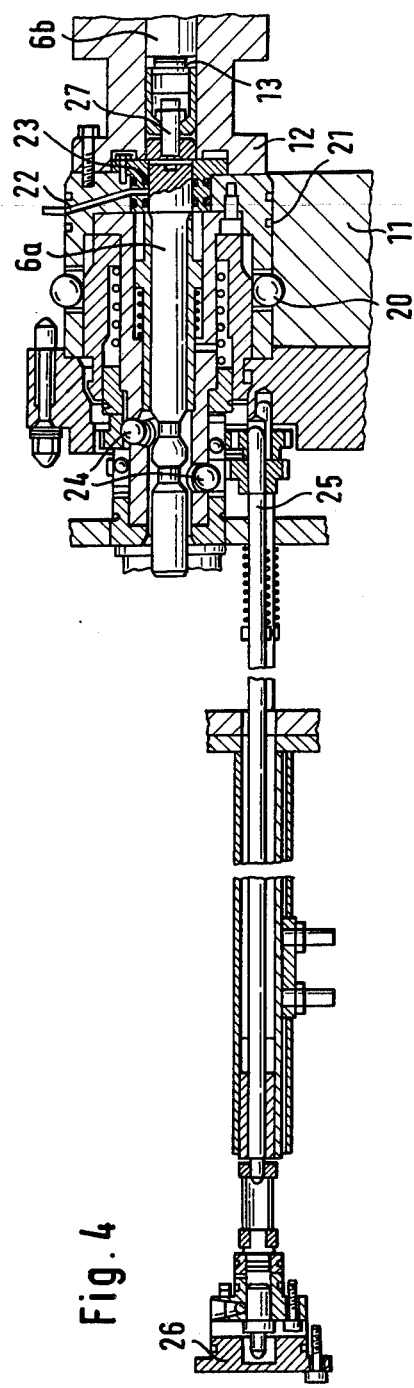
FIG. 4 is a longitudinal sectional view through the locking ball assembly of the screening plug and through the fixing device of the connecting element with the latter being disposed in the screening plug of the apparatus of FIG. 1.
Figure 5:
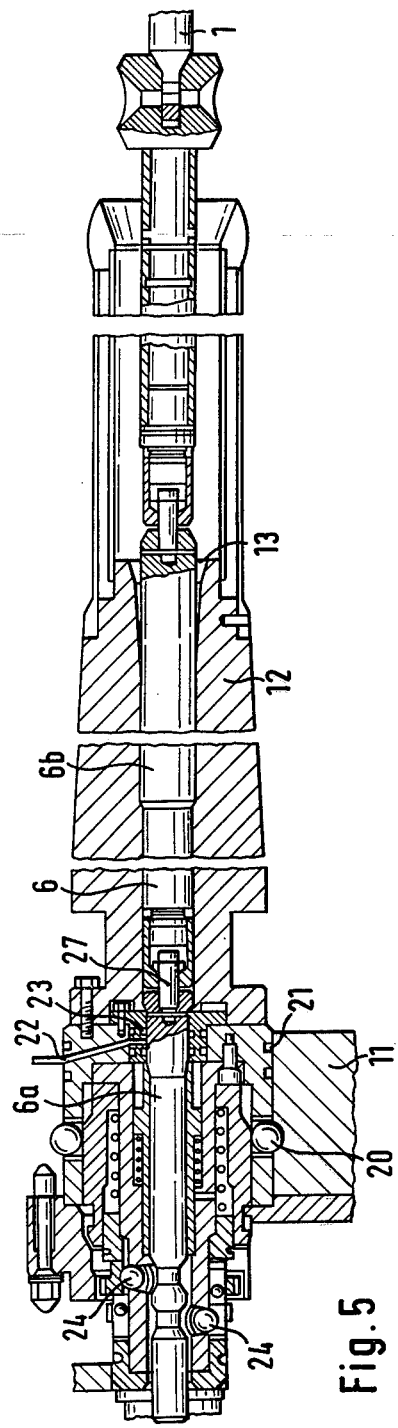
FIG. 5 is a fragmentary sectional view of the connecting element of the apparatus of FIG. 1 in its upper end position.

As shown in FIGS. 4 and 5, screening plug 12 is detachably connected to steel tube 11 by means of a first locking ball assembly 20. Between screening plug 12 and steel tube 11 is disposed a first seal 21, which is equipped with a leakage indicator 22. A second seal 23 is provided between screening plug 12 and the upper end of element 6, which seal 23 is also connected to leakage indicator 22. Element 6 can be fixed in its upper end position by means of a fixing device comprising a second locking ball assembly 24 and an operating mechanism 25 for actuating the locking of assembly 24. As shown in FIG. 4, operating mechanism 25 is set into operation by an actuating device 26, the latter being disposed outside of the reactor pressure vessel.

Element 6 is made of two parts, 6a and 6b, detachably connected to each other. FIG. 5 depicts a coupler 27 for coupling both parts 6a and 6b when movable plug 6 is disposed in its upper end position. This structural configuration of element 6 serves to facilitate the inserting of element 6 into screening plug 12.

Screening plug 12 operates in conjunction with element 6 to provide a complete sealing and isolation of the atmosphere existing in the nuclear reactor from the space occupied by the driving apparatus so that the latter can be maintained or detached without a reduction of the reactor pressure.

In detaching the driving apparatus, absorber rod 1 is first disposed in an extended position in the reactor by moving element 6 into its upper end position and securing element 6 by means of locking ball assembly 24 and operating mechanism 25. Element 6 is then detached from end 15 of round-link chain 4 by decoupling coupling device 14. Rod 1 then remains in the reactor during the repair of the driving apparatus or during the changing of parts of this apparatus so that the dismounting and mounting process can be easily facilitated. The configurations of element 6 and passageway 13 provide a complete sealing and plugging of the internal reactor pressure vessel atmosphere from the exterior during the maintenance operation.

It is to be understood that the embodiment of the invention herewith shown and described is to be taken as a preferred example of the same, and that various changes in the shape, size and arrangement of parts and compositions may be resorted to, without departing from the spirit of the invention or the scope of the subjoined claims.

We claim:

1. A driving apparatus for an absorber rod of a nuclear reactor pressure vessel, which apparatus comprises, in combination:
   (a) a driving assembly including:
      1. a motor;
      2. gear means operatively connected to the motor;
      3. guide means actuated by the gear means, and
      4. a flexible member carried by the guide means for raising and lowering the absorber rod upon actuation of the guide means;
   (b) means for storing the flexible member;
   (c) enclosure means disposed on the pressure vessel for detachably enclosing the driving assembly and the storing means within a desired gaseous atmosphere;
   (d) screening plug means for isolating the interior of the pressure vessel from the interior of the enclosure means and provided with a passageway therethrough;
   (e) a connecting element carried by the absorber rod and disposed within the passageway of the screening plug means for movement between an upper end position and a lower end position, and wherein the cross-sectional configuration of the passageway substantially corresponds to the cross-sectional configuration of the connecting element for permitting the connecting element to function as a movable plug within the passageway;
   (f) means for coupling one end of the flexible member to the connecting element; and
   (g) means for releasably securing the connecting element in position in the passageway through the screening plug means to further isolate the interior of the pressure vessel from the interior of the enclosure.

2. The apparatus of claim 1 wherein:
   (a) the flexible member is a chain having round links, and
   (b) the guide means if a wheel around which the chain is supported in an 180 degree path.

3. The apparatus of claim 1 wherein the other end of the flexible member is connected to a shock absorbing means.

4. The apparatus of claim 1 wherein the motor is a two-phase alternating current motor.

5. The apparatus of claim 4 further including an eddy-current brake means for limiting the speed of the motor.

6. The apparatus of claim 1 wherein the coupling means includes:
   (a) a rotatable hook carried by the one end of the flexible member,
   (b) a counterpart member carried by the connecting element for locking engagement with the hook, and
   (c) means for rotating the hook about a horizontal axis.

7. The apparatus of claim 1 wherein the screening plug means is detachably connected to the enclosure means by a first locking ball assembly.

8. The apparatus of claim 1 further including:
   (a) first means for providing a seal between the screening plug means and the enclosure means, and
   (b) means for indicating leakage in the first seal means.

9. The apparatus of claim 1 further including:
   (a) second means for providing a seal between the screening plug means and the connecting element, and
   (b) means for indicating leakage in the second seal means.

10. The apparatus of claim 1 wherein:
    (a) the enclosure means includes a steel tube, and
    (b) the desired gaseous atmosphere comprises helium.

11. The apparatus of claim 1 wherein the connecting element is disposed within the plug in the upper end position.

12. The apparatus of claim 1 wherein:
(a) the connecting element includes two portions coupled together, and
(b) the coupling point of the two portions is disposed within the passageway of the plug means when the element is in the upper end position.

13. The apparatus of claim 1 wherein the means for detachably securing the connecting element in its upper end position includes a second locking ball assembly.

* * * * *